Feb. 22, 1966 L. R. BURROUGHS 3,236,328

ACOUSTICAL DEVICE WITH PROTECTIVE SCREEN

Filed June 27, 1962

Inventor:
Louis R. Burroughs
By: Stone, Nierman, Burmeister & Zummer
Attorneys

United States Patent Office 3,236,328

Patented Feb. 22, 1966

3,236,328

ACOUSTICAL DEVICE WITH PROTECTIVE SCREEN

Louis R. Burroughs, Buchanan, Mich., assignor to Electro-Voice, Incorporated, Buchanan, Mich., a corporation of Indiana Filed June 27, 1962, Ser. No. 205,704

7 Claims. (Cl. 181—31)

The present invention relates to screens for protecting loudspeakers and wind screens for microphones.

When a microphone is subjected to wind incident thereon, the microphone will respond and produce an electrical output responsive to the wind. The response of the microphone to wind is due principally to three causes. Pressure fluctuations at the microphone due to velocity fluctuations present in the wind which are independent of the presence of the microphone will produce an electrical response. Second, pressure fluctuations due to turbulence produced by the microphone in the wind which otherwise would be free of pressure fluctuations also will produce a response. Third, radiation caused by the first two sources also produces a response. Velocity fluctuations present in the wind itself may be reduced by a wind screen, and turbulence effects may be reduced by streamlining the microphone. The present invention is related to an improved screen for the microphone.

One type of wind screen previously known to the art comprises a frame which surrounds the microphone and is covered by very sheer silk. By means of such a screen, the response of the microphone to wind is substantially reduced without appreciably attenuating the response to sound.

Frames covered with silk and used as wind screens are bulky and fragile. It is an object of the present invention to provide a wind screen which is less bulky than the wind screens of the prior art and more sturdy.

It is a further object of the present invention to provide a wind screen which conforms generally to the exterior contour of a microphone and which reduces the sound radiation from wind striking projecting surfaces of the microphone.

It is a further object of the present invention to provide a screen for a microphone which will dampen the sound generated by solid particles striking the casing of the microphone.

It is a further object of the present invention to provide a screen for use with either a microphone or a loudspeaker which permits the passage of sound therethrough but restrains dirt and other particles from passing from the ambient atmosphere to the electroacoustical transducer.

These and other objects of the present invention will be more readily appreciated from a further consideration of this specification, particularly when viewed in the light of the drawings in which.

Figures 1, 2, 3:
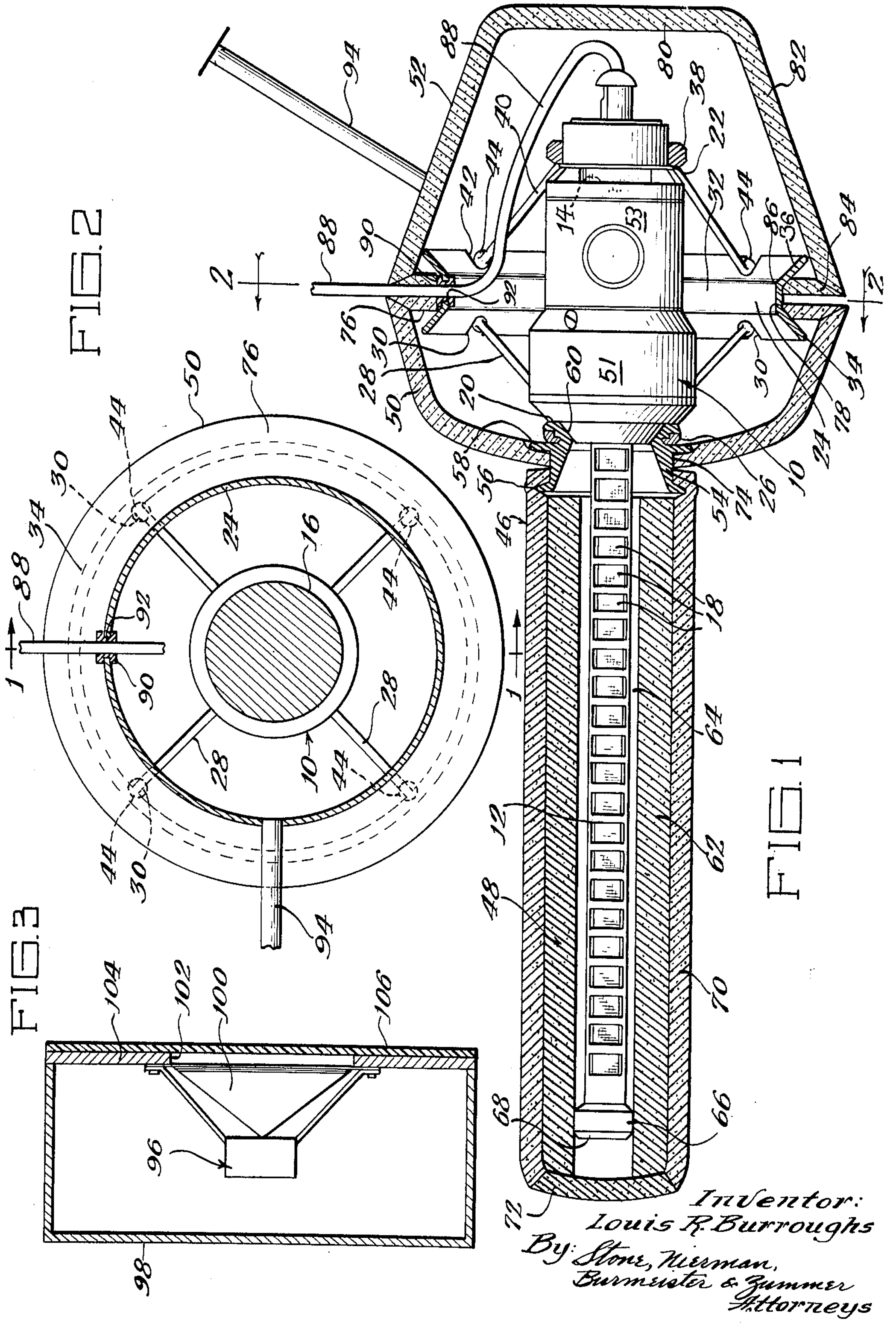
FIGURE 1 is a sectional view of a microphone, microphone support, and wind screen constructed according to the teachings of the present invention, the section being taken along the line 1—1 of FIGURE 2.
FIGURE 2 is a sectional view taken along the line 2—2 of FIGURE 1.
FIGURE 3 is a sectional view of another embodiment of the present invention.

It is to be understood that a wind screen constructed according to the teachings of the present invention may be utilized with a microphone of any construction. However, for purposes of illustrating a preferred embodiment of the present invention, FIGURES 1 and 2 disclose a directional microphone 10 which utilizes an acoustical transmission line 12 in the form of a linear tube extending from the front of the microphone, and an opening 14 in the casing 16 of the microphone adjacent to the rear of the microphone. The patent application Serial No. 848,120, of Wayne A. Beaverson and Robert C. Ramsey entitled "Unidirectional Microphone," filed October 22, 1959, discloses in greater detail a microphone such as illustrated in FIGURES 1 and 2, and reference is made to this application for further details of the microphone.

The transmission line 12 of the microphone is provided with a plurality of apertures 18 which are disposed along the axis of the transmision line. Sound is permitted to enter through these apertures 18 to impinge upon the front side of the diaphragm of the microphone 10 which has not been illustrated. In like manner, sound is free to enter through the opening 14 at the rear of the microphone and impinge upon the rear side of the diaphragm. The transmission line 12 of the microphone produces directional characteristics for frequencies above a transitional frequency, and the opening 14 at the rear of the microphone produces a cardioid directional pattern for frequencies below this transitional frequency.

The casing 16 of the microphone is circular in cross-section and forms a pair of parallel circular flanges 20 and 22 at opposite ends thereof. The microphone 10 is suspended on a ring 24 which extends coaxially about the casing 16 by means of a circular yoke 26 of elastomer material which is disposed in abutment with the flange 20 and a plurality of strands 28 of elastomer material which extend between the yoke 26 and recesses 30 in the ring 24. The ring 24 has a cylindrical section 32 disposed between a pair of rims 34 and 36, and the recsses 30 are disposed within the rim 34.

In like manner, an elastomer yoke 38 with a circular contour is disposed in abutment with the flange 22 and a plurality of strands 40 of elastomer material extend between the yoke 38 and recesses 42 in the rim 36. Each of the strands 28 and 42 is provided with a ball portion 44 at the end of the strand opposite the yoke thereon, and the ball portion 44 abuts the rim of the ring 24 to maintain the microphone 10 in position.

The mounting means for the microphone 10 is the subject of patent application Serial No. 80,916 of the present inventor, filed January 5, 1961, and entitled "Microphone and Mounting Means Assembly," now Patent No. 3,115,780, issued November 3, 1964. Reference is made to this application for a more complete description of the mounting means and its mode of operation.

A wind screen 46 surrounds the entire microphone. This wind screen 46 has three parts, namely, a sleeve portion 48 which surrounds the transmission line 12 of the microphone 10, a front portion 50 which surrounds the forward portion 51 of the casing 16 of the microphone 10 adjacent to the transmission line 12, and a back portion 52 which surrounds the rearward portion 53 of the casing 16 of the microphone 10. In addition, the wind screen 46 includes a mounting flange 54 between the sleeve portion 48 and the front portion 50 for securing the two portions together and forming an acoustical seal therebetween.

The mounting flange 54 is a circular member having three protruding rims, 56, 58, and 60. The mounting flange 54 is disposed about the cylindrical transmission line 12, in abutment with the casing 16 of the microphone 10, and the yoke 26 is disposed between the mounting rims 58 and 60 to also secure the mounting flange 54 in position. The mounting flange 54 is coaxially disposed about the circular transmission line 12. The sleeve portion 48 of the wind screen 46 has an inner cylindrical member 62 which surrounds the transmission line portion 12 and is spaced therefrom by a circular gap 64. The inner cylindrical member 62, however, abuts the cylindrical outer surface of the protruding end member 66 of the transmission line 12, the end member 66 having no openings on its cylindrical surface but being open from the end 68 to permit sound to enter along the axis of the transmission line 12. The sleeve portion 48 of the wind screen 46 also has an outer cylindrical member 70 which is mounted on and coaxially disposed about the inner member 62. The outer member 70 extends over the rim 56 of the mounting flange 54, to secure the sleeve portion 48 on the mounting flange 54. In addition, the opposite end of the outer member 70 extends beyond the end member 66 of the transmission line 12, and is acoustically sealed by a circular member 72. The circular member directly confronts the end 68 of the transmission line 12, but the inner member 62 extends into abutment with the circular member 72.

The front portion 50 of the wind screen 46 is cup shaped and has a central opening 74 which engages the periphery of the mounting flange 54 between the rims 56 and 58. The mounting flange 54 is acoustically sealed within the opening 74, and the cup-shaped front portion 50 is in abutment with the end of the outer member 70 of the sleeve portion 48 of the wind screen 46. The cup-shaped portion of the front member extends about the housing to directly confront the ring 24, and a circular wall 76 extends from the end of the cup-shaped portion of the front portion 50 into abutment with the ring 24 and forms an acoustical seal therewith. The circular wall 76 has an aperture 78 which engages the ring 24 immediately adjacent to the rim 34 thereof.

The back portion 52 is also a cup-shaped member having a flat bottom 80 and conical walls 82 extending therefrom. Also, a circular wall 84 extends from the open end of the conical walls 82 inwardly to an aperture 86 which is in abutment with the ring 24. In this manner, the back portion 52 of the wind screen 46 is sealed on the ring 24.

The microphone 10 has an electrical lead 88 which extends from the end thereof through a grommet 90 disposed in an aperture 92 in the ring 24. The lead 88 extends outwardly between the walls 76 and 84 of the front portion 50 and back portion 52. In addition, a support rod 94 mounted on the ring 24 extends normally therefrom between the walls 76 and 84 of the front portion 50 and back portion 52 of the wind screen 46 for mounting the ring on a supporting structure.

The mounting flange 54 of the wind screen 46 is constructed of solid plastic material, and all other portions of the wind screen 46 are constructed of open cellular foam plastic, as will be further described hereinafter. The inner member 62 of the sleeve portion 48 is constructed of more porous foam plastic than the outer portion 70 and disc portion 72 of the sleeve portion 48. Also, the front portion 50 and back portion 52 of the wind screen are constructed of the same material as the outer portion 70. In a preferred construction, the inner portion 62 is constructed of polyester foam with approximately 80 pores per lineal inch, while the outer portion 70, disc portion 72, front portion and back portion are constructed of polyurethane foam plastic with approximately 60 pores per inch.

The inventor has found that polyurethane foam with from 10 to 80 pores per lineal inch and a thickness between $\frac{1}{16}$ inch and 6 inches is particularly suitable for a microphone wind screen. The polyurethane should be at least 90% voids to function as a good wind screen and preferably should contain at least 97% voids.

In operation, the microphone illustrated in FIGURES 1 and 2 is very slightly susceptible to wind noise. Variations in wind velocity diffuse within the cells of the open cellular foam plastic employed in the wind screen 46. It is to be noted that the transmission line 12 contains a large elongated linear region which is in communication with the ambient atmosphere through the apertures 18, the inner member 62 and the outer member 70 of the sleeve 48. Hence, wind impinging upon the sleeve 48 not only diffuses within the foamed sleeve, but also has an opportunity to average out within the elongated transmission line 12. In like manner, wind impinging upon the front portion 50 and back portion 52 of the wind screen 46 tends to diffuse within the wind screen and to further reach equilibrium within the region between the casing 16 and the front portion 50 and back portion 52 of the wind screen. Hence, the variations in wind velocity impinging upon the microphone are minimized before entering the opening 14 at the rear of the casing 16 or entering into the region of the diaphragm within the casing from the transmission line 12.

FIGURE 3 illustrates an electromechanical transducer 96 disposed within an enclosure 98. The transducer 96 has a cone-shaped diaphragm 100 which confronts an opening 102 in one wall 104 of the enclosure 98. The opening 102 is acoustically sealed by a thin sheet 106 of sound permeable open cellular foamed plastic material. The enclosure 98 is generally rectangular in shape.

It will be recognized that the electroacoustical transducer 96 may be a conventional loudspeaker. In this case, the sheet 106 of foamed plastic material protects the interior of the enclosure 98 and hence the loudspeaker, from dirt and dust particles, but does not substantially interfere with the passage of sound therethrough. It will also be recognized that this electroacoustical transducer may be a microphone, and that the microphone would then have a flat sheet for a wind screen.

One of the advantages of polyurethane, or other plastic wind screens, such as polyethylene or polyester, is that the wind screen thus becomes compliant. When the compliant foam structure is utilized as a wind screen for a microphone, it avoids the presence of sharp corners and the like, which are apt to generate sounds in the presence of wind. In addition, the compliant wind screen serves as a damping or insulating member in the event solid particles strike the microphone structure. When a compliant sheet is utilized, as illustrated in FIGURE 3 for a loudspeaker, the resilience of the sheet because of its foamed plastic material assures a flat or taut covering for the opening confronting the loudspeaker. In addition, the thickness of the open cellular sheet may be utilized to provide a minimum sound resistance or a minimum likelihood of dust particles or dirt entering the enclosure.

Open cellular foamed plastic sheet will be effective as a wind screen for a microphone only if it has sufficient thickness to diffuse impinging wind. It has been found that the thickness of the sheet must be at least equal to twice the diameter of the average cell in said sheet. Since such plastic sheet may be made with small cells, thicknesses as small as $\frac{1}{16}$ inch are effective wind screens.

From the foregoing disclosure, those skilled in the art will readily devise many modifications and many other structures within the intended scope of this invention. It is therefore intended that the scope of the present invention be not limited by the foregoing disclosure, but rather only by the appended claims.

The invention claimed is:

1. An electroacoustical transducer comprising an electroacoustic transducer unit having a casing with an opening therein, a diaphragm disposed within the casing confronting the opening, and a screen acoustically sealed on the casing about the opening and extending over the opening, said screen comprising a member of open cellular foam plastic having a thickness at least equal to twice the diameter of the average cell in said member.

2. An electroacoustical transducer comprising the elements of claim 1 wherein the member has between 10 and 80 cells per linear inch and at least 90 percent of the volume of the member constitutes voids.

3. An electroacoustical transducer comprising the elements of claim 2 wherein the member has a minimum thickness confronting the opening in the casing between 1/16 inch and 6 inches.

4. An electroacoustical transducer comprising the elements of claim 1 wherein the member consists of foamed polyurethane containing approximately 97 percent voids with between 10 and 80 cells per linear inch and a thickness between 1/16 inch and 6 inches.

5. An electroacoustical device comprising the elements of claim 1 wherein the electroacoustic transducer unit comprises a loudspeaker with a diaphragm in the shape of a cone and the casing comprises a loudspeaker enclosure, the periphery of the loudspeaker cone being acoustically sealed about the opening in the enclosure, and the screen comprises a flat sheet extending over the opening and acoustically sealed to the enclosure about the opening.

6. An electroacoustical device comprising the elements of claim 5 wherein the sheet has between 10 and 80 cells per linear inch and at least 90 percent of the volume of the sheet constitutes voids.

7. An electroacoustical device comprising the elements of claim 5 wherein the sheet consists of foamed polyurethane containing approximately 97 percent voids with between 10 and 80 cells per linear inch and a thickness between 1/16 inch and 6 inches.

References Cited by the Examiner

UNITED STATES PATENTS

| | | | |
|---|---|---|---|
| 2,475,782 | 7/1949 | Giannini | 181—31 |
| 2,520,706 | 8/1950 | Anderson et al. | 181—33 |
| 2,556,168 | 6/1951 | Cragg et al. | 179—184 |
| 2,904,124 | 9/1959 | Lyons | 181—31 |
| 2,920,150 | 1/1960 | Burroughs | 179—146 |
| 3,016,575 | 1/1962 | Ebneth. | |
| 3,116,376 | 12/1963 | Behymer et al. | 179—107 |
| 3,125,181 | 3/1964 | Pawlowski | 181—31 |
| 3,138,667 | 6/1964 | Avedon | 181—31 X |
| 3,154,171 | 10/1964 | Knutson et al. | 181—31 |

LEO SMILOW, *Primary Examiner.*

C. W. ROBINSON, *Examiner.*